United States Patent [19]

McDonnell et al.

[11] Patent Number: 4,566,759

[45] Date of Patent: Jan. 28, 1986

[54] LATERALLY FLUORINATED LIQUID CRYSTAL MATERIALS AND FREQUENCY CHANGE DEVICES

[75] Inventors: Damien G. McDonnell; Robert A. Smith, both of Malvern, England

[73] Assignee: The Secretary of State for Defence in Her Britannic Majesty's Government of the United Kingdom of Great Britain and Northern Ireland, London, England

[21] Appl. No.: 603,979

[22] Filed: Apr. 24, 1984

Related U.S. Application Data

[63] Continuation of Ser. No. 309,511, Oct. 7, 1981, abandoned.

[30] Foreign Application Priority Data

Oct. 13, 1980 [GB] United Kingdom ................ 8032944

[51] Int. Cl.$^4$ .................... C09K 19/20; C09K 19/30; C09K 19/32; G02F 1/13
[52] U.S. Cl. ............................... 350/346; 350/350 R; 252/299.5; 252/299.62; 252/299.63; 252/299.64
[58] Field of Search ........... 252/299.5, 299.62, 299.64, 252/299.63; 350/350 R, 346

[56] References Cited

U.S. PATENT DOCUMENTS

| | | | |
|---|---|---|---|
| 3,915,883 | 10/1975 | Van Meter | 252/299 |
| 4,009,934 | 3/1977 | Goodwin | 252/299.64 X |
| 4,099,856 | 7/1978 | Weissflog | 252/299.64 X |
| 4,113,647 | 9/1978 | Coates | 252/299.62 |
| 4,119,558 | 10/1978 | Coates | 252/299.62 X |
| 4,147,656 | 4/1979 | Aldrich | 252/299.64 |
| 4,279,770 | 7/1981 | Inukai | 252/299.63 X |
| 4,279,771 | 7/1981 | Shionozaki | 252/299.63 |
| 4,287,085 | 9/1981 | Takei | 252/299.63 |
| 4,293,434 | 10/1981 | Deutscher | 252/299.63 X |
| 4,331,552 | 5/1982 | Eidenschink | 252/299.6 |
| 4,341,652 | 7/1982 | Takei | 252/299.67 X |
| 4,368,135 | 1/1983 | Osman | 252/299.5 X |
| 4,536,321 | 8/1985 | Sugimori | 350/350 R |

FOREIGN PATENT DOCUMENTS

| | | | |
|---|---|---|---|
| 50-91581 | 7/1975 | Japan | 252/299.64 |
| 55-29545 | 3/1980 | Japan | 252/299.65 |
| 55-84385 | 6/1980 | Japan | 252/299.64 |
| 57-05780 | 1/1982 | Japan | 252/299.63 |
| 1432692 | 4/1976 | United Kingdom | 252/299 |

OTHER PUBLICATIONS

Balkwill et al., "Fluorination in Nematic Systems", Mol. Cryst. Liq. Cryst., 1985, vol. 123, pp. 1–13.
McDonnell et al., "Physical Properties of Fluorene Derivatives of 4-Cyanobiphenyls", Mol. Cryst. Liq. Cryst., 1985, vol. 123, pp. 169–177.
Grey et al., "Synthesis and LC Properties of Laterally Fluorinated ... Esters", Mol. Cryst. Liq. Cryst., vol. 73, part C, p. 657.
Bucher et al, "Frequency-Addressed ... ", Applied Physics Letters, vol. 25, No. 4, Aug. 15, 1974, pp. 186–188.
Raynes et al, "Fast-Switching ... ", Electronics Letters, Apr. 4, 1974, vol. 10, No. 7, pp. 114–115.
Liquid Crystal Displays and Colour Switches, Displays, Apr. 1979, pp. 17–24.
Multicolour Displays Using a Liquid Crystal Colour Switch, by Ian A. Shanks, pp. 18-1–18-11.

Primary Examiner—Teddy S. Gron
Assistant Examiner—Catherine S. Kilby
Attorney, Agent, or Firm—Stevens, Davis, Miller & Mosher

[57] ABSTRACT

A liquid crystal composition suitable for use as a two-frequency material in a two-frequency switching device comprises a mixture of:
a first component comprising at least one diester compound having a formula:

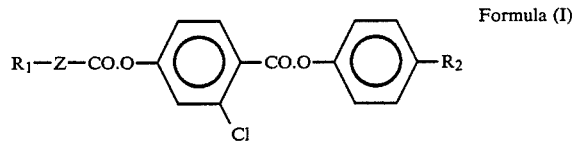

Formula (I)

$R_1$—Z—CO.O—⟨⟩—CO.O—⟨⟩—$R_2$
            |
            Cl where $R_1$ is an alkyl or alkoxy group, Z is an cycloalkyl or aryl ring structure and $R_2$ is alkyl, alkoxy or halogen; or CN; and a second component comprising at least one compound having a formula:

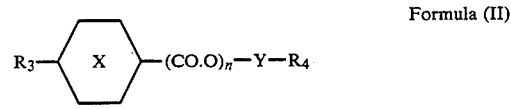

Formula (II)

$R_3$—⟨X⟩—$(CO.O)_n$—Y—$R_4$ wherein $R_3$ and $R_4$ is each independently an alkyl or alkoxy group,

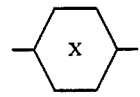

is a trans-1,4-disubstituted cyclohexane or a benzene ring, Y is a cycloalkyl ring or a benzene ring optionally having a lateral halogen substituent and n is 0 or 1.

13 Claims, No Drawings

LATERALLY FLUORINATED LIQUID CRYSTAL MATERIALS AND FREQUENCY CHANGE DEVICES

This application is a continuation of application Ser. No. 309,511, filed Oct. 7, 1981, now abandoned.

The present invention is related to liquid crystal materials.

Liquid crystal materials are well known organic materials comprising single compounds or mixtures of compounds which display phases, known as liquid crystal phases or mesophases, having a degree of molecular ordering intermediate between that of the fully ordered crystalline solid state and the fully disordered isotropic liquid state.

Electro-optical devices incorporating liquid crystal materials are well known and widely used as digital displays in such applications as watches, calculators and digital voltmeters and are finding use in more complex devices such as colour switches and displays. All of these devices utilise the optical contrast obtained when an electric field is applied across a thin insulating film of suitable liquid crystal material. The molecules of the material (in a liquid crystal phase at the temperature of operation) are re-orientated by the field causing a change in an optical property of the part of the film where the field is applied, eg a change in ambient light scattering or transmissivity.

There are several known types of electro-optical effect which are utilised in liquid crystal devices and one type is based on the use of "two-frequency" materials. "Two-frequency" materials may be defined as materials in which an electro-optical effect is obtained by applying to the liquid crystal device (ie across the liquid crystal material), either simultaneously or in sequence, electrical signals of two or more distinct frequencies such that at least one of the frequencies is below the cross-over frequency fo the material (as defined below) and at least one is above fo.

Devices which are used as or are suitable for use as two-frequency devices, ie devices which may employ two-frequency materials, are as described in the following prior art references:

(1) 'Liquid Crystal Displays and Colour Switches' by M G Clark: Displays Vol 1 pages 17-24 (1979).

(2) 'Fast switching twisted nematic electro-optical shutter and colour filter' by E P Raynes and I A Shanks: Electronics Letters Vol 10 pages 114-115, 1975.

(3) 'Multi-colour displays using a liquid crystal colour switch' by I A Shanks: AGARD Conference Proceedings Vol 167 pages 18.1-18.11 (1975).

(4) 'Frequency addressed liquid crystal field effect' by H Bücher, R T Klingbiel and J P Van Meter: Applied Physics Letters, Volume 25 pages 186-188 (1974).

(5) UK Patent Specification No. 1,463,979.

(6) UK Patent Specification No. 1,469,638.

(7) UK Patent Specification No. 1,477,478.

(8) UK Patent Specification GB No. 2,042,202A.

Known two-frequency devices may make use of one of the following kinds of two-frequency effects:

(i) multiplexing of liquid crystal displays either by modulating a signal at a frequency below fo while applying a constant signal above fo, or by modulating a signal above fo while applying a constant signal below fo, or by modulating signals both above and below fo; it is well known to those skilled in the art that higher levels of multiplexing can be attained by these techniques than are possible with signals of a single frequency;

(ii) operation as liquid crystal shutters in which the liquid crystal device is switched into one state by application of a burst of electrical signals at a frequency below fo and back to its other state by application of a burst at a frequency above fo. In this way the shutter may be switched faster than if the natural relaxation time were limiting one of the transitions;

(iii) operation as liquid crystal shutters of the type as in (ii) above which are switched repetitively; such shutters may be used, for example, in frame-sequential displays as disclosed in UK Patent Specification GB No. 2,042,202A.

Two-frequency liquid crystal materials which have been used in known devices have consisted either of (i) materials of a single family type which have a high viscosity (and therefore a relatively slow electro-optical response) and also a liquid crystalline temperature range giving restricted temperatures of operation; (ii) materials which are mixtures which include a component of relatively poor chemical stability or are coloured, eg yellow; or (iii) materials which are mixtures of compounds which do not show adequate dielectric switching properties.

It is an object of the present invention to provide a liquid crystal two-frequency material having an improved combination of properties.

According to the present invention in a first aspect a liquid crystal composition suitable for use as a two-frequency material in a two-frequency switching device comprises a mixture of:

(i) a first component A having a positive dielectric anisotropy at low frequencies and at room temperature comprising one or more compounds containing at least three ring structures linked directly or by linkage groups to give the molecular structure a relatively rigid elongated form;

(ii) a second component B having a low viscosity comprising one or more compounds having a dielectric anisotropy which at low frequencies is either negative, or positive with a magnitude less than one;

the composition being such that its cross-over frequency fo is not greater than 20 kHz at 20° C.; wherein the first component A comprises at least one diester compound having a formula:

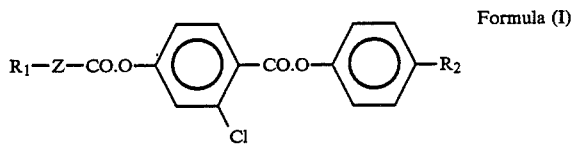

Formula (I)

where $R_1$ is an alkyl or alkoxy group, Z is a cycloalkyl or aryl ring structure and $R_2$ is alkyl, alkoxy or halogen, chloro or cyano; and the second component B comprises at least one compound having a formula:

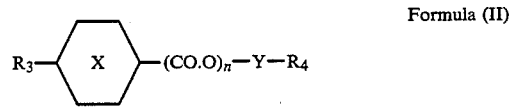

Formula (II)

wherein $R_3$ and $R_4$ is each independently an alkyl or alkoxy group,

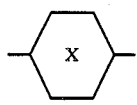

is a trans-1,4-disubstituted cyclohexane or 1,4 disubstituted benzene ring, Y is cycloalkyl ring or a benzene ring optionally having a lateral halogen substituent and n is 0 or 1, with the provisos that $R_3$ is alkyl when

is cyclohexane, $R_4$ is alkyl when Y is cycloalkyl and n is 1 when Y is laterally substituted.

Preferably the viscosity of the composition is less than 100 cps at 20° C.

'Cross-over frequency' is the frequency of electrical signals applied to a liquid crystal material at which the dielectric anisotropy of the material changes from positive to negative.

The relative proportions of component A and component B in the composition according to the first aspect of the invention are selected so that the mixture has the desired properties, ie a cross-over frequency not greater than 20 kHz and a viscosity preferably less than 100 cps at 20° C. Component A may typically comprise between 5% and about 40%, eg about 20%, or between about 55% and 95%, eg about 60%, by weight of the mixture of A plus B to give the required properties. Mixtures wherein component A comprises from 55% to 95% by weight of A plus B are preferred.

Preferred structures for Formula (I) compounds are:

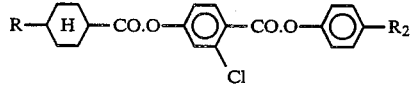
Formula (III)

or

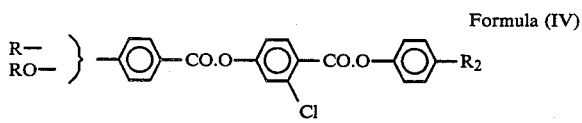
Formula (IV)

or

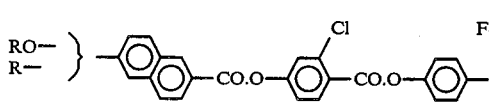
Formula (V)

where each group R is independently an n-alkyl group.

Preferred structures for Formula (II) compounds are:

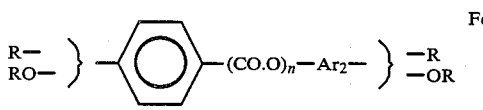
Formula (VI)

or of the form:

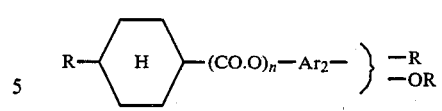
Formula (VII)

where n=0 or 1, $Ar_2$ is a benzene ring which may be laterally substituted, and each group R is independently an n-alkyl group.

Preferred structures for Formula (VI) compounds are:

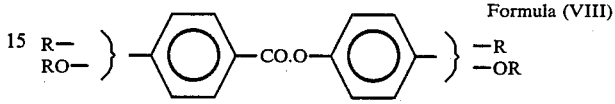
Formula (VIII)

or

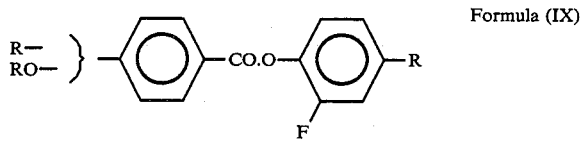
Formula (IX)

or

Formula (X)

where the groups R are the same or different n-alkyl groups.

Preferred structures for Formula (VII) compounds are:

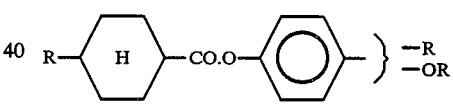
Formula (XI)

or

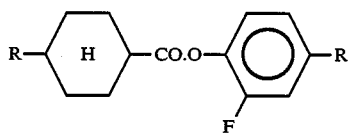
Formula (XII)

or

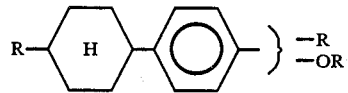
Formula (XIII)

where the groups R are the same or different n-alkyl groups.

Particularly preferred compositions are those in which component A comprises at least one compound of Formula (IV), particularly where $R_2$ is alkyl or alkoxy, and component B comprises at least one compound of Formula (IX).

Component A may for instance comprise two or more compounds of Formula (IV) and component B may comprise two or more compounds of Formula (XII).

Preferred compounds of Formula (IV) for component A are those or Formula:

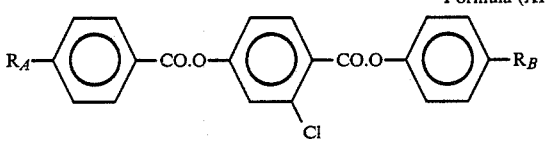
Formula (XIV)

wherein $R_A$ and $R_B$ are independently n-alkyl groups containing from 3 to 7 carbon atoms inclusive. Preferably, $R_A$ is n-$C_3H_7$ n-$C_4H_9$ or n-$C_5H_{11}$ and $R_B$ is n-$C_5H_{11}$.

Preferred compounds of Formula (XII) are those of Formula:

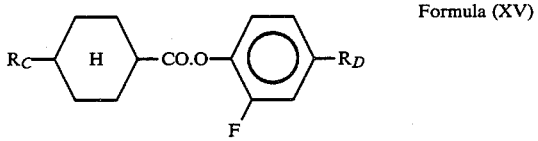
Formula (XV)

where $R_C$ and $R_D$ are independently n-alkyl groups containing from 3 to 7 carbon atoms. Preferably, $R_C$ is n-$C_3H_7$, n-$C_5H_{11}$ or n-$C_7H_{15}$ and $R_D$ is n-$C_5H_{11}$.

Additives such as:
(a) 'high clearing point' compounds; or
(b) 'strongly negative' compounds;
may be added up to about 20% of the overall mixture of the additive(s) plus the composition of components A and B. High clearing point compounds are particularly preferred.

'High clearing point compounds' are compounds having a liquid crystal to isotropic liquid transition at high temperatures, eg above 150° C. Examples are:

(i) 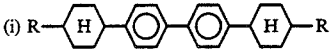 Formula (Q1)

(ii) 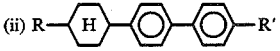 Formula (Q2)

(iii) 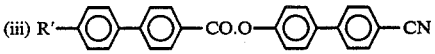 Formula (Q3)

(iv) 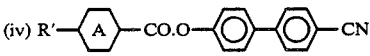 Formula (Q4)

where the groups R are the same or different alkyl groups and the groups R' are alkyl or alkoxy groups which may be the same or different, where

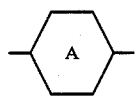

is a trans-1,4-disubstituted cyclohexane ring or a 1,4-disubstituted benzene ring.

The preferred high clearing point compounds are those of Formula (Q1).

A preferred example of a mixture which includes a composition of components A and B plus a high clearing point additive compound is as follows:

| Component A | preferably, two or more compounds of Formula (XIV). | 50–60% by weight |
| Component B | preferably, two or more compounds of Formula (XV). | 35–40% by weight |

High clearing point additive:

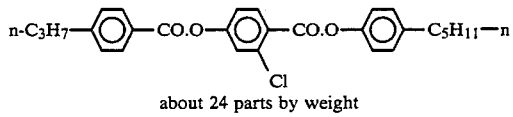 0–10% by weight where $R_E$ and $R_F$ are independently n-alkyl groups containing from 3 to 7 carbon atoms.

Preferably Component A comprises the following mixture of compounds:

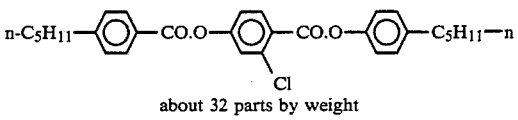
about 24 parts by weight

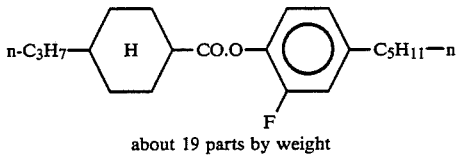
about 32 parts by weight

Preferably, Component B comprises the following mixture:

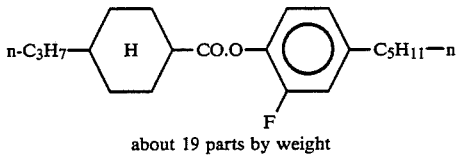
about 19 parts by weight

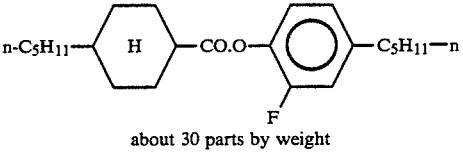
about 30 parts by weight

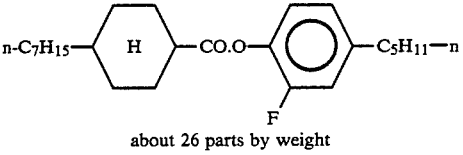
about 26 parts by weight

It has been found that compositions according to the first aspect of the present invention, particularly the preferred compositions containing compounds of Formula (XIV) together with those of Formula (XV) unexpectedly show a favourable combination of the following properties for use as two-frequency switching materials:

liquid crystalline temperature range;
viscosity;
stability and
dielectric switching properties (eg cross-over frequency); lack of colouration, ie they are colourless.

'Strongly negative' compounds, which may be used as additives to the compositions of components A and B, are compounds having a negative dielectric anisotropy having a magnitude greater than 3, eg

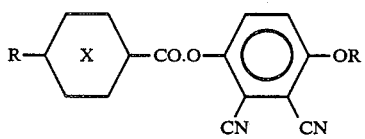 (i)

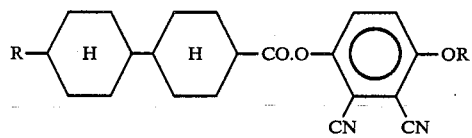 (ii)

where R=alkyl and

is

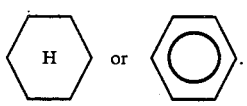

The composition according to the first aspect of the present invention may be a nematic liquid crystal material which is used in its nematic mesophase in two-frequency applications, but it could also be a smectic material used in its smectic mesophase in such applications.

Mixtures of liquid crystal materials may be formed in a known way, eg by heating the components above the mixture clearing point and then stirring for a time (eg 5 mins) at that temperature before allowing the material to cool.

According to the present invention in a second aspect a liquid crystal device includes two dielectric substrates at least one of which is optically transparent, a layer of liquid crystal material sandwiched between the substrates and electrodes on the inner surfaces of the substrates to enable an electric field to be applied across the layer of liquid crystal material to provide an electro-optic effect therein, characterised in that the liquid crystal material consists of or includes a composition according to the first aspect, the device including means for switching the frequency of electric fields applied between electrodes on the respective substrate inner surfaces to cause the dielectric anisotropy of liquid crystal material to be switched between states giving different optical response.

The general construction and operation of devices of the kind to which those of the second aspect belong are known per se. The device according to the second aspect may be any known two-frequency switching device, eg any of those as described in the prior art references given above.

Examples of the composition and properties of mixtures embodying the first aspect of the invention will now be given. In these examples, where the properties given were all measured at 20° C., the following symbols are used:

%=component percentage by weight.

N–I=nematic liquid crystal to isotropic liquid crystal transition temperature (clearing point).

$\epsilon_{||LF}$=dielectric constant measured parallel to the average molecular axis (director) of an aligned liquid crystal at low frequencies ($<<$fo).

$\epsilon_{||HF}$=permittivity measured parallel to the average molecular alignment axis of an aligned liquid crystal at high frequencies ($>>$fo).

$\epsilon_\perp$=permittivity measured perpendicular to the average molecular alignment axis of an aligned liquid crystal.

$\Delta\epsilon_{LF}=\epsilon_{||LF}-\epsilon_\perp$.

$\Delta\epsilon_{HF}=\epsilon_{||HF}-\epsilon_\perp$.

fo=cross-over frequency (as explained above).

$\eta$=viscosity.

$\Delta n$=birefringence.

EXAMPLE 1

Mixture 1

| Component | % | N–I (°C.) |
|---|---|---|
| n-C$_5$H$_{11}$—H—CO.O—⬡(Cl)—COO—⬡—Cl | 26 | |
| n-C$_5$H$_{11}$—H—CO.O—⬡(Cl)—COO—⬡—OC$_4$H$_9$—n | 49 | 118 |
| n-C$_3$H$_7$—H—⬡—OC$_4$H$_9$—n | 25 | |

Properties of Mixture 1

$\Delta n=0.114$
$\epsilon_{||LF}=7.6$
$\epsilon_{||HF}=3.5$
$\epsilon_\perp=6.2$
$\Delta\epsilon_{LF}=+1.4$
$\Delta\epsilon_{HF}=-2.7$
fo=3.9 kHz
$\eta=89$ cps

EXAMPLE 2

Mixture 2

| Component | % | N–I (°C.) |
|---|---|---|
| n-C$_4$H$_9$—⬡—CO.O—⬡(Cl)—COO—⬡—C$_5$H$_{11}$—n | 29 | |
| n-C$_5$H$_{11}$—⬡—CO.O—⬡(Cl)—COO—⬡—C$_5$H$_{11}$—n | 31 | 75 |
| CH$_3$—⬡—CO.O—⬡—C$_5$H$_{11}$—n | 12 | |

-continued

| Component | % | N—I (°C.) |
|---|---|---|
| n-C$_3$H$_7$—⌬—CO.O—⌬—C$_5$H$_{11}$—n | 16 | |
| n-C$_5$H$_{11}$—⌬—CO.O—⌬—C$_5$H$_{11}$—n | 12 | |

Properties of Mixture 2

Δn = 0.15
$\epsilon_{||LF}$ = 9.6
$\epsilon_{||HF}$ = 4.0
$\epsilon_\perp$ = 5.75
$\Delta\epsilon_{LF}$ = +3.85
$\Delta\epsilon_{HF}$ = −1.75
fo = 12 kHz
η = 95 cps

EXAMPLE 3

Mixture 3

| Component | % | N—I (°C.) |
|---|---|---|
| n-C$_4$H$_9$—⌬—CO.O—⌬(Cl)—COO—⌬—C$_5$H$_{11}$—n | 26 | |
| n-C$_5$H$_{11}$—⌬—CO.O—⌬(Cl)—COO—⌬—C$_5$H$_{11}$—n | 28 | |
| CH$_3$—⌬—CO.O—⌬—C$_5$H$_{11}$—n | 11 | 98 |
| n-C$_3$H$_7$—⌬—CO.O—⌬—C$_5$H$_{11}$—n | 14 | |
| n-C$_5$H$_{11}$—⌬—CO.O—⌬—C$_5$H$_{11}$—n | 11 | |
| n-C$_5$H$_{11}$—[H]—⌬—⌬—[H]—C$_3$H$_7$—n | 10 | |

Properties of Mixture 3

Δn = 0.15
$\epsilon_{||LF}$ = 8.9
$\epsilon_{||HF}$ = 3.5
$\epsilon_\perp$ = 5.3
$\Delta\epsilon_{LF}$ = +3.6
$\Delta\epsilon_{HF}$ = −1.8
fo = 8.5 kHz
η = 102 cps

EXAMPLE 4

Mixture 4

| Component | % | N—I (°C.) |
|---|---|---|
| n-C$_4$H$_9$—⌬—CO.O—⌬(Cl)—CO.O—⌬—C$_5$H$_{11}$—n | 29 | |
| n-C$_5$H$_{11}$—⌬—COO—⌬(Cl)—CO.O—⌬—C$_5$H$_{11}$—n | 31 | |
| n-C$_3$H$_7$—[H]—CO.O—⌬(F)—C$_5$H$_{11}$—n | 10 | 80 |
| n-C$_5$H$_{11}$—[H]—CO.O—⌬(F)—C$_5$H$_{11}$—n | 16 | |
| n-C$_7$H$_{15}$—[H]—CO.O—⌬(F)—C$_5$H$_{11}$—n | 14 | |

Properties of Mixture 4

Δn = 0.12
$\epsilon_{||LF}$ = 8.2
$\epsilon_{||HF}$ = 3.6
$\epsilon_\perp$ = 5.5
$\Delta\epsilon_{LF}$ = +2.7
$\Delta\epsilon_{HF}$ = −1.9
fo = 9.0 kHz
η = 90 cps

EXAMPLE 5

Mixture 5

| Component | % | N—I (°C.) |
|---|---|---|
| n-C$_4$H$_9$—⌬—CO.O—⌬(Cl)—CO.O—⌬—C$_5$H$_{11}$—n | 27 | |
| n-C$_5$H$_{11}$—⌬—CO.O—⌬(Cl)—CO.O—⌬—C$_5$H$_{11}$—n | 29 | |
| n-C$_3$H$_7$—[H]—CO.O—⌬(F)—C$_5$H$_{11}$—n | 9.5 | 93 |
| n-C$_5$H$_{11}$—[H]—CO.O—⌬(F)—C$_5$H$_{11}$—n | 15 | |

-continued

| Component | % | N—I (°C.) |
|---|---|---|
| n-C$_7$H$_{15}$—(H)—CO.O—⟨F⟩—C$_5$H$_{11}$-n | 13 | |
| n-C$_5$H$_{11}$—(H)—⟨⟩—⟨⟩—(H)—C$_3$H$_7$-n | 6.5 | |

Properties of Mixture 5
Δn=0.12
ε$_{||LF}$=7.7
ε$_{||HF}$=3.3
ε$_⊥$=5.3
Δε$_{LF}$=+2.4
Δε$_{HF}$=−2.0
fo=6.0 kHz
η=96 cps

EXAMPLE 6
Mixture 6

| Component | % | N—I (°C.) |
|---|---|---|
| n-C$_3$H$_7$—⟨⟩—CO.O—⟨Cl⟩—CO.O—⟨⟩—C$_5$H$_{11}$-n | 24 | |
| n-C$_5$H$_{11}$—⟨⟩—CO.O—⟨Cl⟩—CO.O—⟨⟩—C$_5$H$_{11}$-n | 32 | |
| n-C$_3$H$_7$—(H)—CO.O—⟨F⟩—C$_5$H$_{11}$-n | 9.5 | 101 |
| n-C$_5$H$_{11}$—(H)—CO.O—⟨F⟩—C$_5$H$_{11}$-n | 15 | |
| n-C$_7$H$_{15}$—(H)—CO.O—⟨F⟩—C$_5$H$_{11}$-n | 13 | |
| n-C$_5$H$_{11}$—(H)—⟨⟩—⟨⟩—(H)—C$_3$H$_7$-n | 6.5 | |

Properties of Mixture 6
Δn=0.12
ε$_{||LF}$=8.2
ε$_{||HF}$=3.4
ε$_⊥$=5.2
Δε$_{LF}$=3.0
Δε$_{HF}$=−1.8
fo=4.5 kHz

EXAMPLE 7
Mixture 7

| Component | % | N—I (°C.) |
|---|---|---|
| n-C$_6$H$_{13}$—⟨⟩—CO.O—⟨Cl⟩—CO.O—⟨⟩—C$_5$H$_{11}$-n | 20.0 | |
| n-C$_7$H$_{15}$—⟨⟩—⟨⟩—CO.O—⟨⟩—⟨⟩—CN | 4.5 | |
| n-C$_5$H$_{11}$—(H)—CO.O—⟨F⟩—C$_5$H$_{11}$-n | 26.5 | 73 |
| n-C$_7$H$_{15}$—(H)—CO.O—⟨F⟩—C$_5$H$_{11}$-n | 26.5 | |
| n-C$_7$H$_{15}$—(H)—CO.O—⟨F⟩—C$_7$H$_{15}$-n | 22.5 | |

Properties of Mixture 7
η=45 cps
Δ$_n$=0.10
ε$_{||LF}$=5.7
ε$_{||HF}$=3.4
ε$_⊥$=4.4
Δε$_{LF}$=+1.4
Δε$_{HF}$=−1.0
fo=4 kHz

EXAMPLE 8
Mixture 8

| Component | wt % | N—I (°C.) |
|---|---|---|
| CH$_3$O—⟨⟩—CO.O—⟨⟩—C$_3$H$_7$-n | 7 | |

-continued

| Component | wt % | N—I (°C.) |
|---|---|---|
| CH₃O—⟨◯⟩—COO—⟨◯⟩—C₅H₁₁—n | 10 | |
| CH₃O—⟨◯⟩—COO—⟨◯⟩—C₇H₁₅—n | 7 | |
| n-C₅H₁₁—⟨H⟩—COO—⟨◯⟩(Cl)—COO—⟨◯⟩—OC₄H₉—n | 42 | 139 |
| n-C₅H₁₁—⟨◯◯⟩—COO—⟨◯⟩(Cl)—COO—⟨◯⟩—C₆H₁₃—n | 34 | |

Properties of Mixture 8

Birefringence $\Delta n = 0.14$
Dielectric properties of Mixture 8 at 25° C.
$\epsilon_{||LF} = 7.9$
$\epsilon_{||HF} = 4.0$
$\epsilon_{\perp} = 6.1$
$\Delta\epsilon_{LF} = +1.8$
$\Delta\epsilon_{HF} = -2.1$
$f_o = 640$ Hz

EXAMPLE 9

Mixture 9

| Component | wt % | N—I |
|---|---|---|
| n-C₆H₁₃—⟨◯◯⟩—CO.O—⟨◯⟩(Cl)—CO.O—⟨◯⟩—C₅H₁₁—n | 20 | |
| n-C₇H₁₅—⟨◯⟩—⟨◯⟩—CO.O—⟨◯⟩—CN | 4.5 | |
| n-C₃H₇—⟨H⟩—CO.O—⟨◯⟩—OC₅H₁₁—n | 30 | 92° C. |
| n-C₅H₁₁—⟨H⟩—CO.O—⟨◯⟩—OC₃H₇—n | 30 | |
| n-C₃H₇—⟨H⟩—⟨◯⟩—OC₄H₉—n | 15.5 | |

Properties of Mixture 9

$\eta = 59$ cps  $\Delta n = 0.11$
$\Delta\epsilon_{LF} = 1.5$

-continued
$\Delta\epsilon_{HF} = 1.4$ } at 20° C.
$f_o = 1.6$ kHz.

Compounds used in the above Examples are known and some are commercially available.

The fluoro-substituted esters of Formula (XII) are described in UK Patent Specification No. 2,063,250A and the diesters of Formula (IV) are described in UK Patent Specification No. 1,432,692.

The diesters of Formula (I) wherein $R_2 = Cl$ are described in UK Patent Application No. 8114487.

I claim:

1. A liquid crystal composition suitable for use as a two-frequency material in a two-frequency switching device, the composition comprising a mixture of:
   i. a first component A having a positive dielectric anisotropy and consisting of one or more compounds having a general formula:

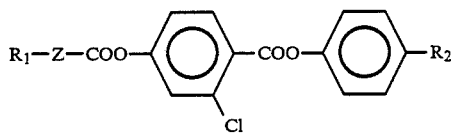

wherein $R_1$ and $R_2$ are independently n-alkyl groups having from 3 to 7 carbon atoms; and Z is selected from 1,4-phenylene, trans-1,4-cyclohexyl, and 2,6-naphthyl; and
   ii. a second component B having a low viscosity and consisting of one or more compounds having a general formula:

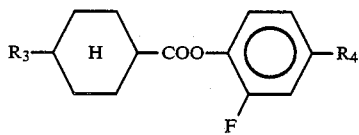

wherein $R_3$ and $R_4$ are independently n-alkyl groups having from 3 to 7 carbon atoms.

2. A composition as claimed in claim 1, wherein component A comprises from 50 to 60% by weight of the composition.

3. A composition as claimed in claim 1, which additionally comprises:
iii. a high clearing point additive, component C, forming up to 20% by weight of the composition.

4. A composition as claimed in claim 3, wherein component A forms from 50 to 60% by weight of the composition, component B forms from 35 to 40% by weight of the composition, and component C forms up to 10% by weight of the composition.

5. A composition as claimed in claim 3, wherein component C comprises one or more compounds having a formula:

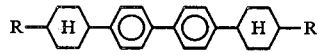

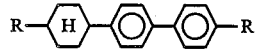

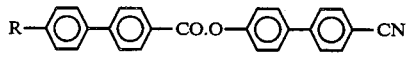

or

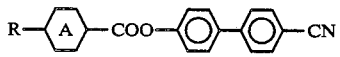

wherein each R is independently n-alkyl and

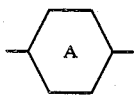

represents either

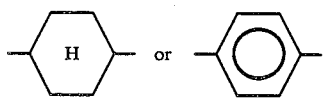

6. A composition as claimed in claim 1, which additionally comprises an additional component comprising one or more strongly negative compounds having a negative dielectric anisotropy with a magnitude greater than 3.

7. A composition as claimed in claim 1, wherein Z is 1,4-phenylene, $R_2$ is n-$C_5H_{11}$, and $R_1$ is selected from n-$C_5H_{11}$ and n-$C_3H_7$.

8. A composition as claimed in claim 1, wherein $R_4$ is n-$C_5H_{11}$ and $R_3$ is selected from n-$C_3H_7$, n-$C_5H_{11}$, and n-$C_7H_{15}$.

9. A composition as claimed in claim 1, wherein component A comprises:

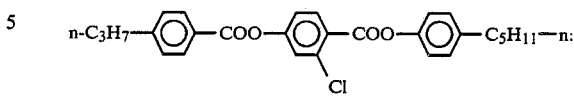

about 25 parts by weight; together with

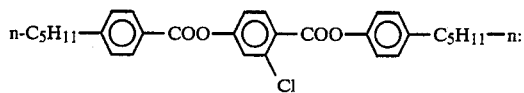

about 32 parts by weight;

and wherein component B comprises:

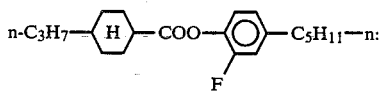

about 19 parts by weight

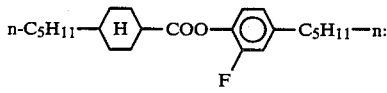

about 30 parts by weight

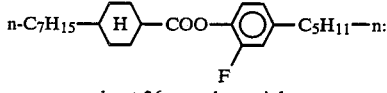

about 26 parts by weight.

10. A composition as claimed in claim 1, which is a mixture of the following compounds in at least approximately the stated percentages by weight of the overall mixture:

| Compound | % |
|---|---|
| n-$C_3H_7$—⟨○⟩—COO—⟨○⟩(Cl)—COO—⟨○⟩—$C_5H_{11}$—n | 24 |
| n-$C_5H_{11}$—⟨○⟩—COO—⟨○⟩(Cl)—COO—⟨○⟩—$C_5H_{11}$—n | 32 |
| n-$C_3H_7$—⟨H⟩—COO—⟨○⟩(F)—$C_5H_{11}$—n | 9.5 |
| n-$C_5H_{11}$—⟨H⟩—COO—⟨○⟩(F)—$C_5H_{11}$—n | 15 |
| n-$C_7H_{15}$—⟨H⟩—COO—⟨○⟩(F)—$C_5H_{11}$—n | 13 |
| n-$C_5H_{11}$—⟨H⟩—⟨○⟩—⟨○⟩—⟨H⟩—$C_3H_7$—n | 6.5 |

11. A composition as claimed in claim 1, which is a mixture of the following compounds in at least approximately the stated percentages by weight of the overall mixture:

| Compound | % |
|---|---|
| n-C$_4$H$_9$—⟨O⟩—CO.O—⟨O⟩(Cl)—CO.O—⟨O⟩—C$_5$H$_{11}$—n | 27 |
| n-C$_5$H$_{11}$—⟨O⟩—CO.O—⟨O⟩(Cl)—CO.O—⟨O⟩—C$_5$H$_{11}$—n | 29 |
| n-C$_3$H$_7$—⟨H⟩—CO.O—⟨O⟩(F)—C$_5$H$_{11}$—n | 9.5 |
| n-C$_5$H$_{11}$—⟨H⟩—CO.O—⟨O⟩(F)—C$_5$H$_{11}$—n | 15 |
| n-C$_7$H$_{15}$—⟨H⟩—COO—⟨O⟩(F)—C$_5$H$_{11}$—n | 13 |
| n-C$_5$H$_{11}$—⟨H⟩—⟨O⟩—⟨O⟩—⟨H⟩—C$_3$H$_7$—n | 6.5 |

12. A composition as claimed in claim 1, which is a mixture of the following compounds in at least approximately the stated percentages by weight of the overall mixture:

| Compound | % |
|---|---|
| n-C$_4$H$_9$—⟨O⟩—CO.O—⟨O⟩(Cl)—CO.O—⟨O⟩—C$_5$H$_{11}$—n | 29 |
| n-C$_5$H$_{11}$—⟨O⟩—CO.O—⟨O⟩(Cl)—CO.O—⟨O⟩—C$_5$H$_{11}$—n | 31 |
| n-C$_3$H$_7$—⟨H⟩—CO.O—⟨O⟩(F)—C$_5$H$_{11}$—n | 10 |
| n-C$_5$H$_{11}$—⟨H⟩—CO.O—⟨O⟩(F)—C$_5$H$_{11}$—n | 16 |
| n-C$_7$H$_{15}$—⟨H⟩—CO.O—⟨O⟩(F)—C$_5$H$_{11}$—n | 14. |

13. A liquid crystal device comprising two dielectric substrates at least one of which is optically transparent, a layer of liqud crystal material sandwiched between the substrates and electrodes on the inner surfaces of the substrates to enable an electric field to be applied across the layer of liquid crystal material to provide an electrooptic effect therein, the device also including means for switching the frequency of electric fields applied between the electrodes on the respective substrate inner surfaces to cause the dielectric anisotropy of liquid crystal material to be switched between states giving different optical response, and wherein the improvement comprises the liquid crystal material being a composition as claimed in claim 1.

* * * * *